US008915424B2

(12) United States Patent
Massicot et al.

(10) Patent No.: US 8,915,424 B2
(45) Date of Patent: Dec. 23, 2014

(54) SHEET, METHOD AND DEVICE FOR MANUFACTURING A SHEET AND METHOD AND DEVICE FOR IDENTIFYING A SHEET

(75) Inventors: Jean-Pierre Massicot, Rueil-Malmaison (FR); Alain Foucou, Rueil-Malmaison (FR); Zbigniew Sagan, Rueil-Malmaison (FR)

(73) Assignee: Advanced Track & Trace, Rueil-Malmaison (FR)

( * ) Notice: Subject to any disclaimer, the term of this patent is extended or adjusted under 35 U.S.C. 154(b) by 68 days.

(21) Appl. No.: 13/992,119

(22) PCT Filed: Nov. 25, 2010

(86) PCT No.: PCT/FR2010/052527
§ 371 (c)(1),
(2), (4) Date: Jul. 19, 2013

(87) PCT Pub. No.: WO2011/064504
PCT Pub. Date: Jun. 3, 2011

(65) Prior Publication Data
US 2013/0299573 A1    Nov. 14, 2013

(30) Foreign Application Priority Data
Nov. 25, 2009 (FR) ...................... 09 05664

(51) Int. Cl.
*G06K 19/06* (2006.01)
*G07D 7/00* (2006.01)
*G07D 7/20* (2006.01)
*G06K 5/00* (2006.01)
*B42D 15/00* (2006.01)

(52) U.S. Cl.
CPC .......... *G06K 19/0614* (2013.01); *G07D 7/0046* (2013.01); *G06K 19/06037* (2013.01); *G07D 7/2033* (2013.01); *G06K 5/00* (2013.01); *B42D 15/0013* (2013.01)
USPC ....................................... 235/375

(58) Field of Classification Search
USPC ......................................... 235/375
See application file for complete search history.

(56) References Cited

U.S. PATENT DOCUMENTS

| 6,089,611 | A  | * | 7/2000  | Blank ........................ 283/67 |
| 6,755,443 | B1 |   | 6/2004  | Fresnel |
| 2006/0131425 | A1 |   | 6/2006  | Stenzel et al. |
| 2007/0276558 | A1 | * | 11/2007 | Kim ............................ 701/23 |
| 2010/0201995 | A1 | * | 8/2010  | Yoshida .................... 358/1.2 |
| 2011/0071944 | A1 | * | 3/2011  | Heiden et al. ............. 705/41 |

FOREIGN PATENT DOCUMENTS

| AU | 2007254655 A1 | 7/2009 |
| FR | 2796922 A1 | 2/2001 |
| WO | 2009/004172 A2 | 1/2009 |

* cited by examiner

Primary Examiner — Allyson Trail
(74) Attorney, Agent, or Firm — IM IP Law PLLC; C. Andrew Im

(57) ABSTRACT

A planar sheet comprising, on a first surface of the sheet, at least one printed mark, and on a second surface of the sheet, opposite the first surface, at least one invisible printed mark vertically adjacent to the mark printed on the first surface. In at least one pair of vertically adjacent marks formed on the opposite surfaces, at least one of the marks of the pair has unique content. At least one invisible mark can be a two-dimensional barcode and/or at least one invisible mark can be a copy-protection mark. The content of at least one mark can be representative of the position of an invisible mark on the sheet.

10 Claims, 4 Drawing Sheets

SHEET, METHOD AND DEVICE FOR MANUFACTURING A SHEET AND METHOD AND DEVICE FOR IDENTIFYING A SHEET

RELATED APPLICATIONS

This application is a §371 application from PCT/FR2010/052527 filed Nov. 25, 2010, which is herein incorporated by reference in its entirety.

TECHNICAL FIELD OF INVENTION

This invention relates to a sheet, a method and a device for manufacturing a sheet and a method and a device for identifying a sheet. It applies, in particular, to the authentication of a paper sheet.

BACKGROUND OF THE INVENTION

Many means are known for authenticating a sheet, by giving it recognizable characteristics during the manufacture of a sheet. For example, a watermark makes it possible to modify a sheet's local transparency. Similarly, inserting materials, such as fibers or bands, into the paper should allow the sheets formed with this paper to be made forgery-proof.

However, these techniques are very costly and are reproduced, more or less closely, by counterfeiters.

There are techniques for memorizing physical characteristics of a sheet, for example the shape of fibers in a given portion of the sheet. However, recognition of the sheet on the basis of a new analysis is very sensitive to variations in the analysis angle, particularly of the image sensor, and in the end can only be used in a laboratory.

OBJECT AND SUMMARY OF THE INVENTION

The aim of the present invention is to remedy these drawbacks.

To this end, according to a first aspect, this invention envisages a planar sheet, characterized in that it comprises:
  on a first surface of the sheet, at least one printed mark;
  on a second surface of the sheet, opposite said first surface, at least one invisible printed mark vertically adjacent to a mark printed on said first surface;
  in at least one pair of vertically adjacent marks formed on said opposite surfaces, at least one of the marks of said pair has unique content.

Thanks to these provisions, the sheet is protected in three ways. Firstly, determining the presence of an invisible mark provides a first level of protection. Secondly, the precision of the superimposition of the marks gives a second level of protection since it is very difficult to superimpose the printing of two marks on two opposite surfaces of a sheet with precision. In addition, the unique content of at least one mark borne by the sheet allows the sheet to be identified unequivocally.

According to particular features, in at least one pair of vertically adjacent marks each printed mark is invisible. Detecting the sheet's protection is thus even more difficult.

According to particular features, each of the marks of at least one pair of vertically adjacent marks has unique content. Identification of the sheet is therefore even stronger.

According to particular features, at least one said invisible mark is a two-dimensional barcode. Thanks to these provisions, once an image of the mark has been taken, standard processing systems can be used.

According to particular features, at least one said invisible mark is a copy-protection mark. Thanks to these provisions, it can be determined whether the sheet is an original or a copy.

According to particular features, at least one invisible mark is formed with a varnish. Thanks to these provisions, the mark is especially durable.

According to particular features, the content of at least one mark is representative of the position of an invisible mark on the sheet. Thus, to find an invisible mark, the content of another mark, e.g. visible, is used.

According to a second aspect, this invention envisages a method of manufacturing a planar sheet, characterized in that it comprises:
  a step of generating a mark having unique content;
  a step of printing, on a first surface of the sheet, at least one printed mark; and
  a step of printing, on a second surface of the sheet, opposite said first surface, at least one invisible printed mark vertically adjacent to a mark printed on said first surface.

In at least one printing step, for at least the pair of vertically adjacent marks formed on said opposite surfaces, at least one of the marks is a generated mark having unique content.

According to a third aspect, this invention envisages a method of identifying a sheet, characterized in that it comprises:
  a step of capturing an image of a first mark on a first surface of the sheet;
  a step of capturing an image of a second mark on a second surface of the sheet, vertically adjacent to the first mark;
  a step of reading the content of one of the first and second marks; and
  a step of identifying the sheet according to said content.

According to particular features, at least one of the steps of capturing an image comprises a step of depositing visible material on the mark of which an image is captured.

According to a fourth aspect, this invention envisages a device for manufacturing a planar sheet, characterized in that it comprises:
  a means of generating a mark having unique content;
  a means of printing, on a first surface of the sheet, at least one printed mark; and
  a means of printing, on a second surface of the sheet, opposite said first surface, at least one invisible printed mark vertically adjacent to a mark printed on said first surface.

At least one printing means, for at least the pair of vertically adjacent marks formed on said opposite surfaces, is designed so that at least one of the marks is a generated mark having unique content.

According to a fifth aspect, this invention envisages a device for identifying a sheet, characterized in that it comprises:
  a means of capturing an image of a first mark on a first surface of the sheet;
  a means of capturing an image of a second mark on a second surface of the sheet, vertically adjacent to the first mark;
  a means of reading the content of one of the first and second marks; and
  a means of identifying the sheet according to said content.

As the particular characteristics, advantages and aims of this manufacturing method, this identification method, this manufacturing device and this identification device are similar to those of the sheet that is the subject of this invention, as described in brief above, they are not repeated here.

BRIEF DESCRIPTION OF THE DRAWINGS

Other advantages, aims and particular features of the present invention will become apparent from the description that will follow, made, as a non-limiting example, with reference to the drawings included in an appendix, in which.

DETAILED DESCRIPTION OF EMBODIMENTS

Note that the figures are not to scale.

Figure 1:
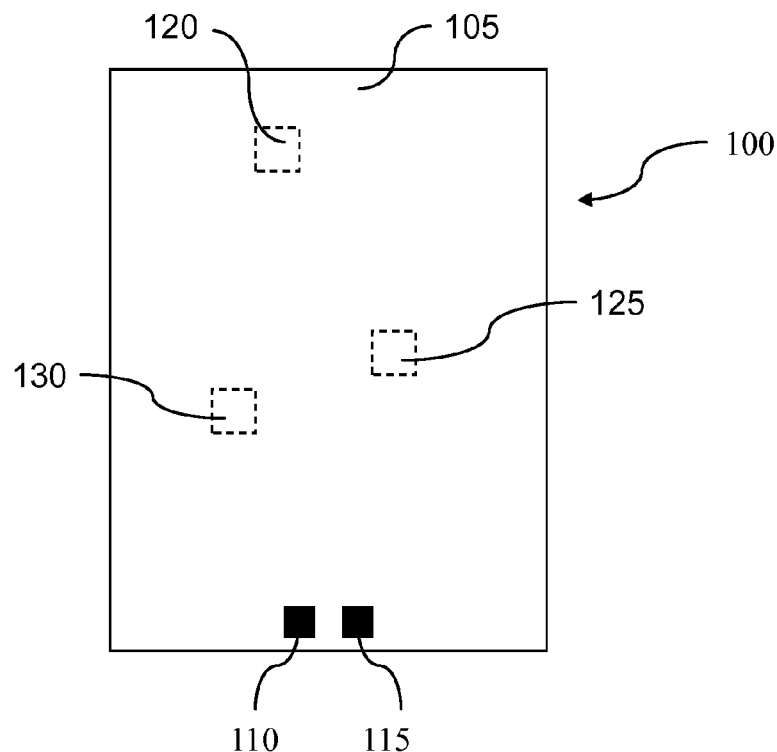
FIG. 1 represents, schematically, a first surface of a particular embodiment of a sheet that is the subject of this invention.
Figure 2:
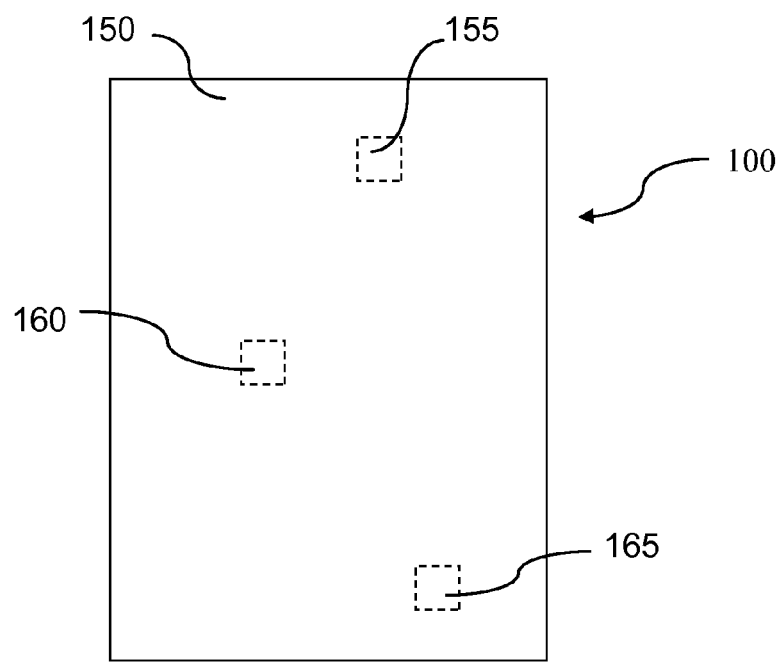
FIG. 2 represents, schematically, a second surface of the sheet shown in FIG. 1.

FIGS. 1 and 2 show a planar sheet 100, which comprises:
on a first surface 105, shown in FIG. 1, five printed marks 110, 115, 120, 125 and 130, and
on a second surface 150, shown in FIG. 2, three printed marks 155, 160 and 165.

Sheet 100 is a planar sheet. It is, for example, made of paper, laminated paper, fabric or plastic. In the case shown, the sheet 100 is a standard-format sheet. The surfaces 105 and 150 are therefore coplanar.

Printed mark 110 is a visible mark positioned at the bottom of the page. The content of mark 110 varies from one sheet to another and, preferably, is unique for the sheet in question. In the embodiment described, mark 110 is a two-dimensional barcode, also called "Datamatrix". Printed mark 115 is a visible mark placed next to mark 110. The content of mark 115 varies from one sheet to another and, preferably, is unique for the sheet in question. In the embodiment described, mark 115 is a copy-protection mark, i.e. its characteristics degrade in a measurable way during copying of the sheet 100.

For example, a copy-protection mark comprises a high level of redundancies and is printed with a resolution, linked to the print quality, such that, when printed, as a result of ad-hoc random physical phenomena, the redundancy rate to be utilized for correcting and reading the content of the copy-protection mark is high, preferably greater than 10 percent. Thus, a copy of the copy-protection mark, made with printing means of a similar quality to those used for the initial printing, causes an increase in the quantity of redundancies, to be utilized for correcting and reading the content of the copy-protection mark, that can be detected so as to recognize an original from a copy.

The reader may refer to sheet WO 2009 004172 (PCT FR2008/00743) for the determination and manufacture of the mark 115.

The content of marks 110 and 115 is correlated, i.e. the content of one of the marks 110 or 115 is a function of the content of the other mark.

Printed marks 120, 125 and 130 are invisible marks. They are formed, for example, with varnish or an enhanced invisible ink, water-based. Mark 120 has a fixed content, i.e. common to a set of sheets. Marks 125 and 130 have a unique content, i.e. only the sheet 100 bears them.

Printed marks 155, 160 and 165 are invisible marks. They are formed, for example, with varnish. Mark 155 is vertically adjacent to mark 120, i.e. it has the same dimensions as mark 120 and its outline is vertically adjacent to the outline of mark 120. Marks 120 and 155 therefore have symmetrical shapes with respect to an axis of the sheet's plane. Mark 160 is vertically adjacent to mark 125. Lastly, mark 165 is not vertically adjacent to any mark of the first surface 105. The content of marks 155 and 160 is unique.

Thus, in at least one pair of vertically adjacent marks 120-155 or 125-160, at least one of the marks of the pair has unique content.

According to variants, the sheet that is the subject of this invention does not comprise any visible mark.

Figure 3:
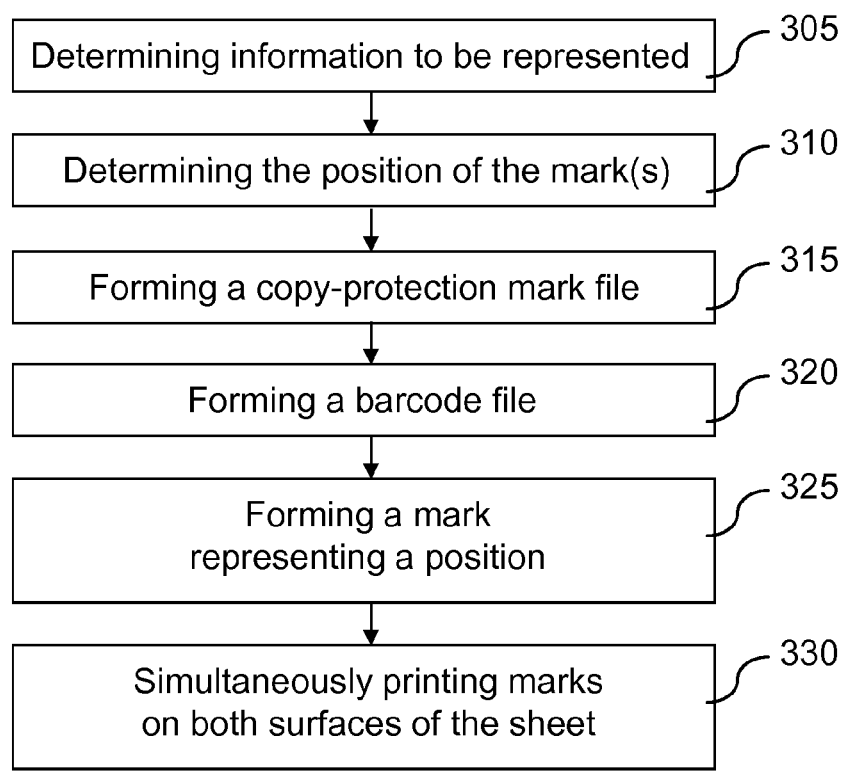
FIG. 3 represents, in the form of a logical diagram, steps utilized in a particular embodiment of the manufacturing method that is the subject of this invention.

FIG. 3 shows that, to manufacture a sheet that is the subject of this invention, first of all a step 305 is performed of determining information that the content of the marks to be printed has to bear.

For example, this information comprises:
a manufacturing order,
a production unit identifier,
a manufacturing date,
a manufacturing type,
a unique serial number and/or
a placer of the manufacturing order.

During a step 310, a print position for at least one pair of vertically adjacent marks is determined. For example, this position is determined randomly.

Then, during a step 315, a copy-protection type of mark is formed representative of at least one part of the information obtained during step 305.

During a step 320, a two-dimensional barcode type of mark is formed representative of at least one part of the information obtained during step 305.

During a step 325, a mark is formed representative of the position of each pair of vertically adjacent marks.

Preferably, during steps 315, 320 and 325, error correction codes (or FEC, for "forward error correction") are inserted into the content of the marks. The proportion of FEC redundancies is higher for the copy-protection marks than for the two-dimensional barcodes.

It is noted that the marks coming from steps 315, 320 and 325 are files of dots, e.g. binary, representing the print values to be realized. For example, in the case of binary marks, for each dot to be printed, one value represents printing and another value represents the absence of printing.

During a step 330, the two surfaces of a sheet are printed simultaneously to form on it the set of marks, visible or invisible, vertically adjacent or not, described with reference to FIG. 1. Preferably, the mark representative of the position of the other marks is printed visibly and in a fixed position on the various sheets.

Figure 4:
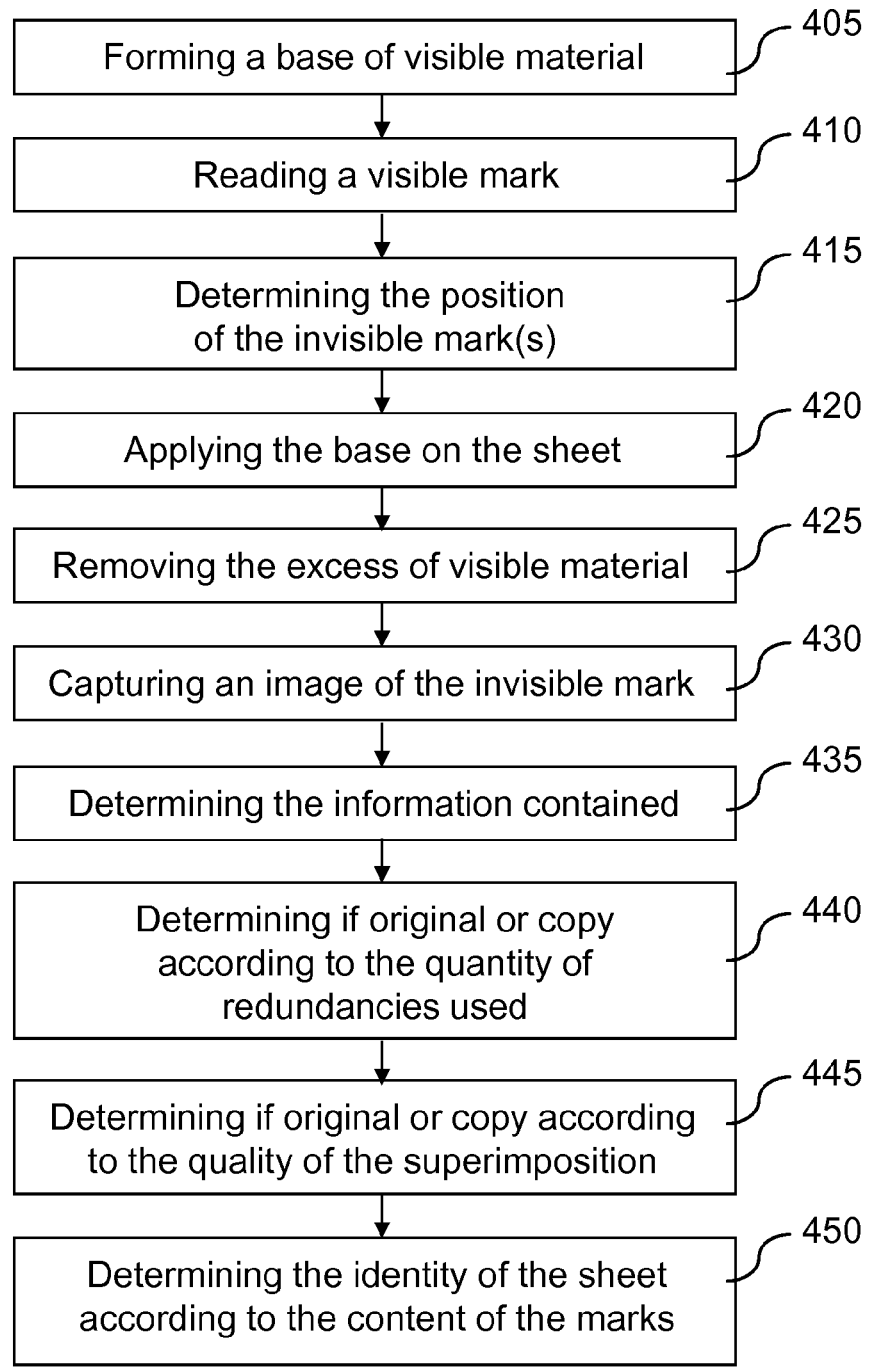
FIG. 4 represents, in the form of a logical diagram, steps utilized in a particular embodiment of the identification method that is the subject of this invention.

FIG. 4 shows that, to identify a sheet, i.e. to recognize it in a unique way, in an embodiment of the identification method that is the subject of this invention, first of all a step 405 is performed of forming a base of uniform visible material. For example, carbon black is deposited on a sheet.

Then, during a step 410, a visible mark on the sheet is read.

During a step 415, the position of each invisible mark is determined according to the content of the visible mark.

During a step 420, the visible material is applied on the sheet, at the places where the invisible marks are located.

During a step 425, the excess visible material is removed from the places where the invisible marks are located, e.g. by applying and removing an adhesive in these places.

During a step 430, an image is captured of the invisible mark made visible by the remains of the visible material deposited, during steps 420 and 425.

It is noted that this image capture can be performed on the sheet or on an adhesive having removed an excess of visible material.

Steps 415 to 430 are repeated for the invisible marks borne on the two surface 105 and 150 of the sheet 100.

In a variant, steps 420 and 425 are eliminated and during step 430 a light with a non-visible wavelength and a sensor capable of capturing the light emitted, reflected or filtered by each invisible mark, are used to take an image of each invisible mark.

During a step 435, the information contained in the visible marks is determined. Preferably, error correction codes are utilized to correct the errors represented by the captured images and the quantity of FEC redundancies used to correct the errors of the copy-protection marks is measured.

During a step 440, it is determined, according to the redundancy quantity used to correct the copy-protection marks, whether the sheet is an original or a copy.

During a step 445, the precision of the superimposition of the vertically adjacent invisible marks is measured and, according to a limit value (e.g. a distance), it is determined whether the sheet is an original or a copy. To do this, the images are processed to determine the position of the center of each invisible mark, on each of the surfaces of the sheet, and the distance between the centers of two vertically adjacent invisible marks is determined.

During a step 450, an identity of the sheet is determined, according to the content of the marks borne by the sheet and, in particular, according to the content of the invisible marks.

It is noted that steps 435 and 445 can be performed locally or remotely, e.g. by a server.

Figure 5:
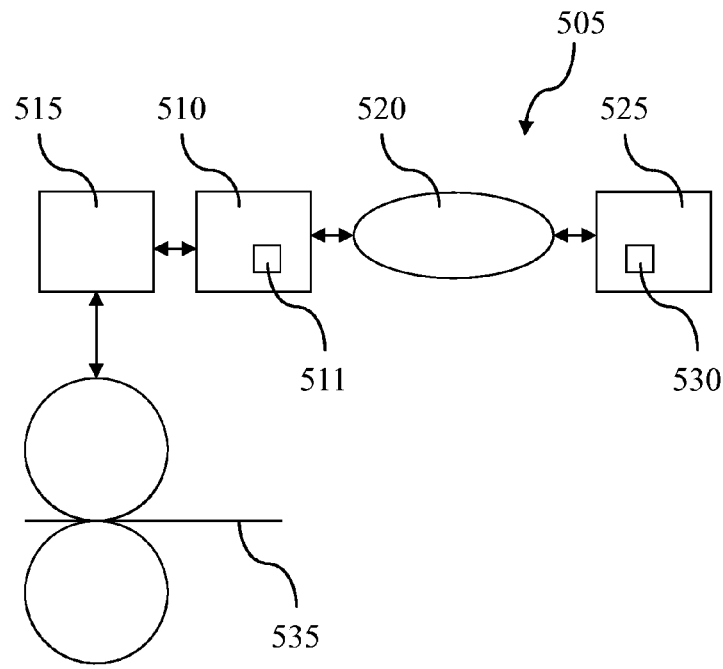
FIG. 5 represents, schematically, a particular embodiment of the manufacturing device that is the subject of this invention.

FIG. 5 shows a manufacturing device 505 comprising:
a central processing unit 510 equipped with memories 511;
a printer 515; and
a connection to a computer network 520, for communicating with a remote server 525.

The central processing unit 510 is designed to implement the steps illustrated in FIG. 3, by executing the instructions of a computer program held in its memories 511, in combination with the server 525, and to control the printer 515. The server 525 hosts a database 530 wherein an identifier of each sheet is held with the associated information, as described with reference to step 305.

The computer network 520 is, for example, the Internet network.

The printer 515 is designed to simultaneously print marks on the two surfaces of the sheet 535. In a variant, marks on the two surfaces are printed successively.

Figure 6:
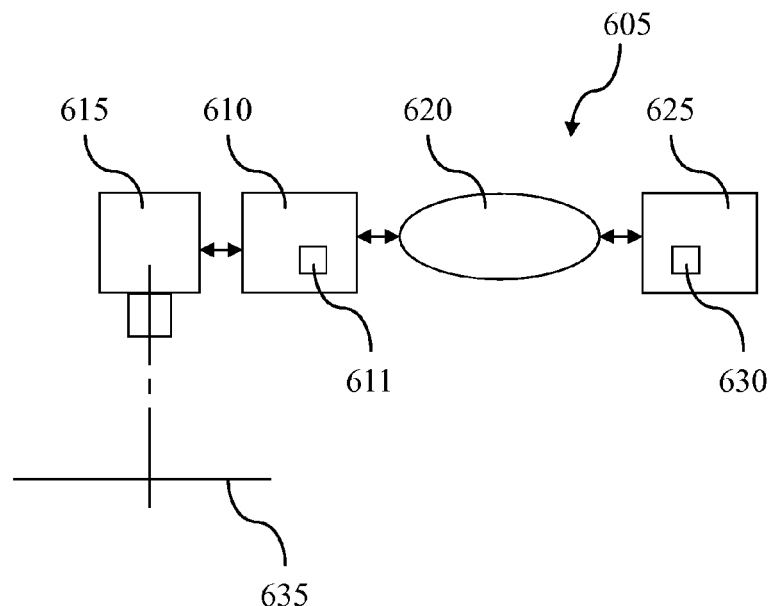
FIG. 6 represents, schematically, a particular embodiment of the identification device that is the subject of this invention.

FIG. 6 shows an identification device 605 comprising:
a central processing unit 610 equipped with memories 611;
an image capture means 615; and
a connection to a computer network 620, for communicating with a remote server 625.

The central processing unit 610 is designed to implement the steps illustrated in FIG. 4, by executing the instructions of a computer program held in its memories 611, in combination with the server 625, and to control the capturing of images by the image capture means 615. The server 625 hosts a database 630 wherein an identifier of each sheet is held with the associated information, as described with reference to step 305.

The computer network 620 is, for example, the Internet network. The image capture means 615 are, for example, comprised of a visible or invisible light source and an image sensor designed to supply an image representative of a visible or invisible mark borne by a sheet 635.

This invention finds applications in particular in the manufacture of paper that is mostly or completely uniform, on which information can be written or printed, in order to subsequently certify that the sheet thus formed is an original.

The invention claimed is:

1. Planar sheet, comprising:
on a first surface of the sheet, at least one printed mark;
on a second surface of the sheet, opposite said first surface, at least one invisible printed mark vertically adjacent to the printed mark on said first surface;
in at least one pair of vertically adjacent marks formed on said opposite surfaces, at least one of the marks of said pair has unique content; and
wherein a content of said printed mark on said first surface is representative of a position of said invisible mark on said second surface of the sheet.

2. Sheet according to claim 1, wherein, each printed mark in said pair of vertically adjacent marks is invisible.

3. Sheet according to claim 1, wherein each mark of said pair of vertically adjacent marks has unique content.

4. Sheet according to claim 1, wherein said invisible mark is a two-dimensional barcode.

5. Sheet according to claim 1, wherein said invisible mark is a copy-protection mark.

6. Sheet according to claim 1, wherein said invisible mark is formed with a varnish.

7. Method for manufacturing a planar sheet, comprising the steps of:
generating a mark having unique content;
printing, on a first surface of the sheet, at least one printed mark;
printing, on a second surface of the sheet, opposite said first surface, at least one invisible printed mark vertically adjacent to the printed mark on said first surface;
wherein a content of said printed mark on said first surface is representative of a position of said invisible mark on said second surface of the sheet; and
wherein at least one of the marks in at least one pair of vertically adjacent marks formed on said opposite surfaces is the generated mark having unique content.

8. Method for identifying a sheet, comprising the steps of:
capturing an image of a first mark on a first surface of the sheet;
capturing an image of a second invisible printed mark on a second surface of the sheet, said second mark being vertically adjacent to the first mark printed on said first surface;
reading the content of one of the first and second marks, at least one of the marks of said pair having unique content;
identifying the sheet according to said unique content; and
wherein at least one of the steps of capturing the image comprises the step of depositing visible material on the mark of the captured image.

9. Device for manufacturing a planar sheet, comprising:
a device for generating a mark having unique content;
a printer for printing, on a first surface of the sheet, at least one printed mark, and printing on a second surface of the sheet, opposite said first surface, at least one invisible printed mark vertically adjacent to the printed mark on said first surface;
wherein a content of said at least one printed mark on said first surface is representative of a position of said at least one invisible mark on said second surface of the sheet; and wherein for at least one pair of vertically adjacent marks printed on said opposite surfaces, at least one of the marks is the generated mark having unique content.

10. Device for identifying a sheet, comprising:
an image capturing device for capturing an image of a first mark on a first surface of the sheet, and capturing an image of a second invisible printed mark on a second surface of the sheet, said second mark being vertically adjacent to a mark printed on said first surface;
a reader for reading the content of one of the first and second marks, at least one of the marks of said pair having unique content;
a processor for identifying the sheet according to said content; and
wherein the image capturing device captures at least one of the images after depositing visible material on the mark of the captured image.

* * * * *